(12) United States Patent
Boche et al.

(10) Patent No.: US 11,647,022 B2
(45) Date of Patent: May 9, 2023

(54) METHOD AND SYSTEM FOR PROVIDING ACCESS TO DATA STORED IN A SECURITY DATA ZONE OF A CLOUD PLATFORM

(71) Applicant: SIEMENS AKTIENGESELLSCHAFT, Munich (DE)

(72) Inventors: Maik Boche, Oberasbach (DE); Stefan Burger, Munich (DE); Michael Ebert, Coburg (DE); Bernd Haberstumpf, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/289,635

(22) PCT Filed: Sep. 18, 2019

(86) PCT No.: PCT/EP2019/075033
§ 371 (c)(1),
(2) Date: Apr. 28, 2021

(87) PCT Pub. No.: WO2020/088836
PCT Pub. Date: May 7, 2020

(65) Prior Publication Data
US 2021/0367943 A1      Nov. 25, 2021

(30) Foreign Application Priority Data

Oct. 29, 2018  (EP) .................................... 18203102

(51) Int. Cl.
*H04L 9/40* (2022.01)
(52) U.S. Cl.
CPC ........ *H04L 63/0884* (2013.01); *H04L 63/083* (2013.01); *H04L 63/0815* (2013.01); *H04L 63/102* (2013.01)

(58) Field of Classification Search
CPC ............ H04L 63/0884; H04L 63/0815; H04L 63/083; H04L 63/102; H04L 63/0823; G06F 21/33; H06L 9/3263
See application file for complete search history.

(56) References Cited

U.S. PATENT DOCUMENTS 9,495,293 B1 * 11/2016 Srivastav ................ G06F 16/13
10,397,207 B1 *  8/2019 Huynh ................ H04L 63/0838
(Continued)

FOREIGN PATENT DOCUMENTS

CN          105659241 A       6/2016

OTHER PUBLICATIONS

Daniel J. Dean et al., "Engineering Scalable, Secure, Multi-tenant Cloud for Healthcare Data," 2017, pp. 21-29. (Year: 2017).*
(Continued)

*Primary Examiner* — Luu T Pham
*Assistant Examiner* — Canh Le
(74) *Attorney, Agent, or Firm* — Lempia Summerfield Katz LLC

(57) ABSTRACT

A method and a system for providing access by an application to data stored in a security data zone of a cloud platform are provided. The method includes determining, in response to a query received from a querying application of the cloud platform, credentials for a security data zone based on determining whether a first access token included in the received query belongs to an application registered at an access manager module of the cloud platform, and whether the user specified in the received query is allowed to use the registered application. The method also includes determining a second access token to the querying application generated based on the determined credentials. The querying application uses a returned second access token to obtain (Continued)

access to data stored in the security data zone to be processed by the querying application.

17 Claims, 1 Drawing Sheet

(56) References Cited

U.S. PATENT DOCUMENTS

| | | |
|---|---|---|
| 2012/0159180 A1 | 6/2012 | Chase et al. |
| 2014/0282821 A1 | 9/2014 | Adler |
| 2014/0298420 A1 | 10/2014 | Barton et al. |
| 2015/0082407 A1 | 3/2015 | Galpin et al. |
| 2015/0262164 A1 | 9/2015 | Ranganathan et al. |
| 2017/0169249 A1* | 6/2017 | de Oliveira ............ H04L 67/10 |
| 2017/0331829 A1 | 11/2017 | Lander et al. |
| 2019/0103968 A1* | 4/2019 | Srinivasan ............. G06F 21/41 |
| 2019/0123967 A1* | 4/2019 | Dotchkoff ............... H04W 4/50 |
| 2019/0207772 A1* | 7/2019 | Hecht ..................... H04L 63/10 |
| 2020/0021573 A1* | 1/2020 | Kondarev ........... H04L 63/0807 |

OTHER PUBLICATIONS

Li Zhou et al., "High Availability Green Gear-Shifting Mechanism in Cloud Storage System," 2005, pp. 303-314. (Year: 2005).*
European Search Report for European Application No. 18203102.1-1218 dated Jan. 7, 2019.
PCT International Preliminary Report on Patentability dated Oct. 29, 2020, corresponding to PCT International Application No. PCT/EP2019/075033.
PCT International Search Report and Written Opinion of International Searching Authority dated Oct. 30, 2019 corresponding to PCT International Application No. PCT/EP2019/075033.

* cited by examiner

METHOD AND SYSTEM FOR PROVIDING ACCESS TO DATA STORED IN A SECURITY DATA ZONE OF A CLOUD PLATFORM

This application is the National Stage of International Application No. PCT/EP2019/075033, filed Sep. 18, 2019, which claims the benefit of European Patent Application No. EP 18203102.1, filed Oct. 29, 2018. The entire contents of these documents are hereby incorporated herein by reference.

BACKGROUND

In many use cases, an operator or a service provider may provide an application to a user. Such an application needs access rights to operate, for example, on a cloud platform. An application may be executed to analyze data generated by an automation system (e.g., of a user of the cloud platform). Accordingly, an application provided by a service provider to a user needs access rights to perform a read and/or write access of relevant data of the respective user. For a plurality of users, this may prove difficult to be implemented because each user may have his own credentials to provide read and/or write rights for one or more applications when executed by the user.

SUMMARY AND DESCRIPTION

The scope of the present invention is defined solely by the appended claims and is not affected to any degree by the statements within this summary.

The present embodiments may obviate one or more of the drawbacks or limitations in the related art. For example, efficient access is provided by an application to data (e.g., to data of a plurality of different) users or to data stored in different storages, such as storages having different security access levels).

The present embodiments provide a method for providing access by an application to data stored in a security data zone of a customer of a cloud platform. The method includes determining (e.g., retrieving), by an access manager module (e.g., executed by a processor) of the cloud platform in response to a query received from a querying application of the cloud platform, credentials for the security data zone based on determining, by the access manager module, whether a first access token included in the received query belongs to an application registered at the access manager module, and whether the user specified in the received query is allowed to use the registered application. The method also includes determining (e.g., returning), by the access manager module of the cloud platform, a second access token generated based on the retrieved credentials to the querying application to obtain access to data stored in the security data zone to be processed by the querying application.

In a possible embodiment of the method according to the first aspect of the present embodiments, the application is registered by a service provider module at the access manager module of the cloud platform for assignment of at least one first access token including a manager access login name and/or a manager access password.

In a possible embodiment of the method according to the first aspect of the present embodiments, the access manager module of the cloud platform is notified by a service provider module of the service provider of the respective application about a relationship between a first user and a second user (e.g., the service provider and a customer), which allows the respective user (e.g., customer) to use the application of the service provider registered at the access manager module.

In a possible embodiment of the method according to the first aspect of the present embodiments, the query is transmitted by the querying application to the access manager module when the application is initiated on a client device of a user.

In a possible embodiment of the method according to the first aspect of the present embodiments, the credentials for the security data zone of the user include a user name and/or a password.

In a still further possible embodiment of the method according to the first aspect of the present embodiments, the second access token is generated by an identity and access management unit of the cloud platform.

In a further possible embodiment of the method according to the first aspect of the present embodiments, the returned second access token is used by the querying application to perform a read access and/or a write access to data stored in the security data zone of the respective user.

In a still further possible embodiment of the method according to the first aspect of the present embodiments, the data stored in the security data zone of the user accessed by the querying application are processed by the application to evaluate and/or to manipulate data (e.g., Internet of Things IoT data) of the user.

In a still further possible embodiment of the method according to the first aspect of the present embodiments, the security data zone of a user includes a logically separated data storage area in a data storage resource connected with the cloud platform or forming part of the cloud platform.

In a possible embodiment of the method according to the first aspect of the present embodiments, the generated unique second access token is valid for a predefined time period.

In a still further possible embodiment of the method according to the first aspect of the present embodiments, credentials for the security data zone of the user undergo an automatic rotation.

The present embodiments further provide, according to a second aspect, a system for providing access by an application to data stored in a security data zone of a cloud platform. The system includes an access manager module adapted to determine, in response to a query received from a querying application of the cloud platform, credentials for the security data zone if the access manager module determines that a first access token included in the received query belongs to an application registered at the access manager module, and that the user specified by the received query is allowed to use the registered application. The access manager module is further adapted to return a second access token generated based on the determined credentials to the querying application, which uses the returned second access token to obtain access to data stored in the security data zone of the respective user to be processed by the querying application.

In a possible embodiment of the system according to the second aspect of the present embodiments, the application is registered by a service provider module at the access manager module of the cloud platform for assignment of at least one first access token including a manager access login name and/or a manager access password, where the access manager module of the cloud platform is notified by a service provider module of the service provider of the respective application about a relationship between the service provider and the user that allows the respective user to use the registered application of the service provider.

In a further possible embodiment of the system according to the second aspect of the present embodiments, the application is adapted to use the returned second access token to perform a read access and/or a write access to data stored in the security data zone of the respective user. The data stored in the security data zone of the user is accessed by the application and processed by the application to evaluate and/or to manipulate data (e.g., Internet of Things IoT data) of the user.

In a further possible embodiment of the system according to the second aspect of the present embodiments, the security data zone of a user includes a logical separated data storage area in a data storage resource connected with the cloud platform or forming part of the cloud platform.

The present embodiments further provide a computer program product having a program code that, when executed on a microprocessor, performs the method according to the first aspect of the present embodiments.

The present embodiments further provide a system (e.g., including a microprocessor) configured to perform the method according to the first aspect of the present embodiments.

DETAILED DESCRIPTION

Figure 1:
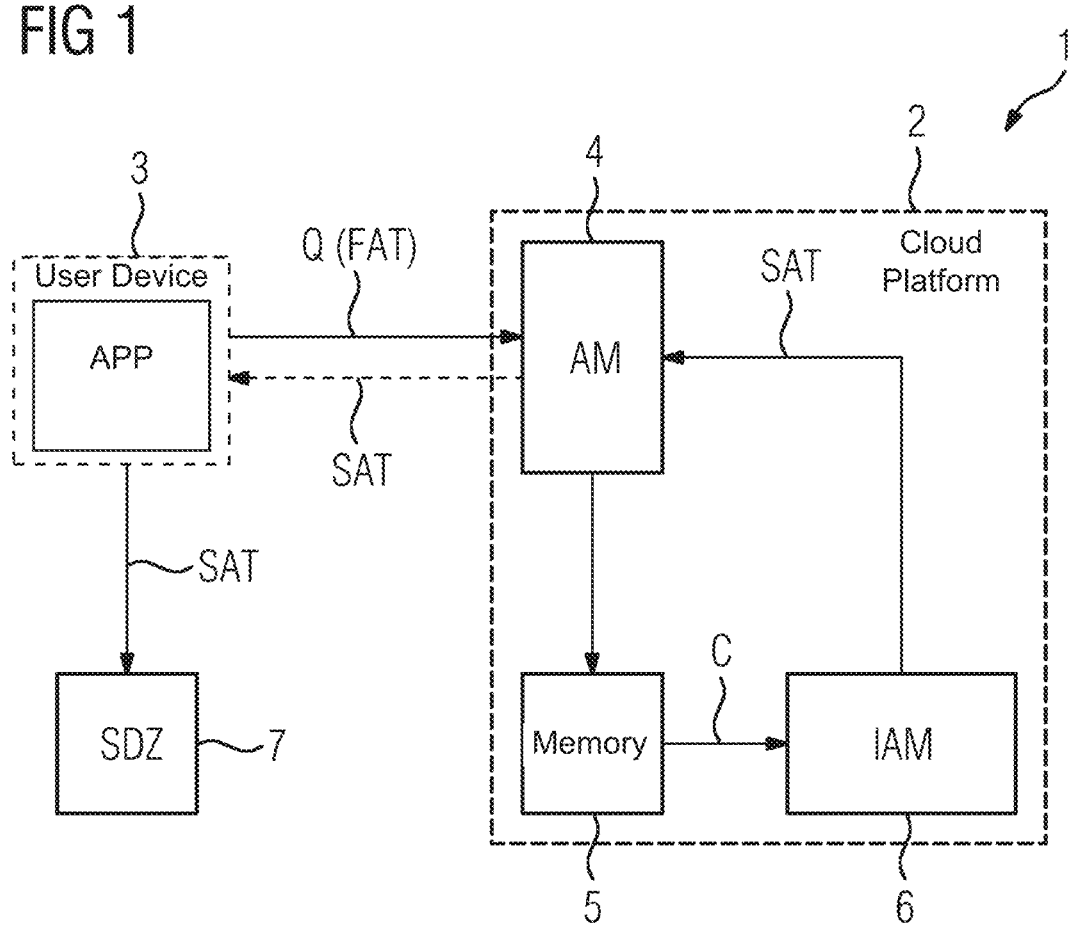
FIG. 1 shows a block diagram of a possible exemplary embodiment of a system.

As shown in the block diagram of FIG. 1, a system 1 according to the present embodiments provides access by an application APP to data stored in a security data zone SDZ (e.g., of a customer) using a cloud platform 2. The application APP may be provided by a service provider module of a service provider to the user. The application APP may be executed on a user device 3, such as a user device of a respective customer. The device 3 of the user or customer may be equipped with the application APP by the service provider module. The application APP may be used to evaluate and/or to manipulate data of the respective user stored in a data storage area assigned to the respective user. After having provided the user with the application APP, the service provider module may register the application APP with an access manager module 4 of the cloud platform 2 for assignment of at least one first access token FAT (e.g., manager access token). The first access token FAT may include, in a possible embodiment, a manager access login name and/or a manager access password. The access manager module 4 of the cloud platform 2 is notified in a possible embodiment by the service provider module of the respective application APP about an existing relationship between the service provider and a specific user or customer that allows the respective user to use the registered application APP of the service provider. The relationship may be, for example, a contract (e.g., a machine-readable contract), allowing the respective user to use the application APP provided by the service provider module. The registered application APP may be installed on a hardware platform of the user (e.g., a terminal or a mobile user device 3 of the user). The user device 3 includes a processor adapted to execute the application APP. In a possible embodiment, the application APP may be downloaded from a server of the service provider and stored in a local program memory of the user device 3. In a possible embodiment, the access manager module 4 of the cloud platform 2 is notified by the service provider module implemented on the server of the service provider about the established relationship between the service provider and the specific customer or user, where the relationship allows the respective user to use the registered application APP of the service provider.

When the application APP is started or initiated on a client device or user device 3 of the customer, a query Q is generated by the application APP and transmitted by the application APP to the access manager module 4. The query Q transmitted by the application APP to the access manager module 4 includes the assigned first access token FAT (e.g., a manager access login name and/or a manager access password). The access manager module 4 of the cloud platform 2 determines (e.g., retrieves), in response to the received query Q, credentials C for a security data zone 7 of the user if the access manager module 4 determines that the received first access token FAT included in the received query Q belongs to a registered application APP of a service provider, and further determines that the user specified in the received query Q is allowed to use the registered application APP. The access manager module 4 may retrieve the credentials C in a possible embodiment from a lookup table LUT stored in a memory 5 of the cloud platform 2, as shown in FIG. 1. In a possible embodiment, the retrieved credentials C are supplied to an identity and access management (IAM) unit 6 of the cloud platform 2 that generates the second access token SAT (e.g., zone access token) based on the retrieved credentials C. The second access token SAT generated by the identity and access management IAM unit 6 may be returned to the access manager module 4, which forwards the second access token SAT back to the querying application APP as also illustrated in FIG. 1. The access manager module 4 of the cloud platform 2 returns the second access token SAT to the querying application APP, which uses the returned second access token SAT to obtain access to data stored in the security data zone 7 of the respective customer. The returned second access token SAT may be used by the querying application APP executed on the processor of the user device 3 to perform a read access and/or to perform a write access to data stored in the security data zone 7 of the respective user. The data stored in the security data zone 7 of the user accessed by the application APP may be processed by the application APP to evaluate and/or to manipulate data of the customer. The data may include, in a possible embodiment, Internet of Things IoT data of the respective user stored in the security data zone 7 of the customer. The security data zone 7 of the user includes a logical separated data storage area in a data storage resource connected with the cloud platform 2 or forming part of the cloud platform 2. In a possible embodiment, the second access token SAT is a unique zone access token being valid only for a predefined time period. After the time period has elapsed, the second access token SAT becomes invalid. This increases the security of the system 1 according to the present embodiments. In a possible embodiment, the credentials C for a security data zone 7 of a user may undergo an automatic rotation. In a possible embodiment, the access manager module 4 may form part of a key manager API of the cloud platform 2. The key manager API may issue access tokens for IoT data consuming users that have access to the respective application (e.g., after provisioning). In a possible embodiment, access to the access manager module 4 (e.g., key manager access token and user name) may be preconfigured. An operator or service provider may automatically create an entry in the configuration of the access manager module 4 for applications and may also add in a possible embodiment credentials C for any operator, tenant, or user. During provisioning an application, an IoT value plan tenant, user, or operator may add a further entry into the configuration of the access manager module 4 for the new user. The application may query the access manager module 4 using the first access token FAT provided by the operator to retrieve a list of tenants or customers and using the retrieved first access token FAT to process the corresponding data. The first access tokens FATs may be application specific. In a possible embodiment, the application APP may, for example, continuously calculate key performance indicators KPI based on incoming time series data for multiple tenants for calculating results. Another use case may be the training of an analytical data model periodically, which may take multiple hours to finish. In a possible embodiment, a secure and exclusive background data processing only for a certain user or customer may be provided using a key manager module for a key rotation for every call or request for data by an application APP.

Figure 2:
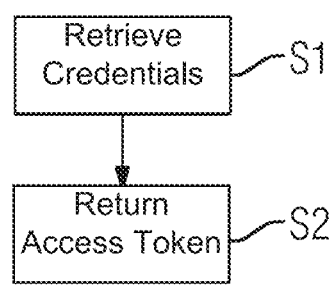
FIG. 2 shows a flowchart of a possible exemplary embodiment of a method for providing access to data stored in a security data zone of a customer.

FIG. 2 shows a flowchart of a possible exemplary embodiment of a method according to a further aspect of the present embodiments. The method illustrated in FIG. 2 is used for providing an efficient access by an application APP of a service provider to data stored in a security data zone 7 of a customer using a cloud platform 2. In the illustrated exemplary embodiment, the method includes two main acts.

In a first act S1, credentials for a security data zone 7 of a customer are retrieved by an access manager module 4 of the cloud platform 2 in response to a query Q received from an application APP in case that the access manager module 4 determines that a first access token FAT included in the received query Q belongs to an application APP of a service provider registered at the access manager module 4, and that the user specified in the received query Q is further allowed to use the registered application APP.

In a further act S2, the access manager module 4 of the cloud platform 2 returns a second access token SAT generated based on the retrieved credentials to the querying application APP that uses the returned second access token SAT to obtain access to data stored in the security data zone 7 of the respective user to be processed by the querying application APP. The second access token SAT may also provide access to other resources of a network (e.g., data storage resources and/or data processing resources).

In a setup phase, the application APP is first registered by a service provider module at the access manager module 4 of the cloud platform 2 for assignment of at least one first access token FAT. This first access token FAT may include a manager access login name and/or a manager access password. Further, in the setup phase, the access manager module 4 of the cloud platform 2 is notified by the respective service provider module of the service provider of the application APP about the existing relationship between the service provider and the user, where the relationship allows the respective user to use the registered application APP of the service provider.

In a possible embodiment, credentials C or any other kind of secret information stored in the memory 5 may be rotated in response to a query Q received from an application APP requesting a new second access token (e.g., SDZ access token) and it turns out that the stored credential C is outdated. In a possible embodiment, the credentials C are stored in encrypted form and are decrypted before being supplied to the IAM unit 6. In a possible embodiment, credentials C may be rotated in configurable time intervals.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing access by an application to data stored in a security data zone of a cloud platform, the method comprising:
   receiving a query from a querying application of the cloud platform, the query including a first access token;
   determining, by an access manager module of the cloud platform, in response to the query received from the querying application of the cloud platform, credentials for a security data zone based on the first access token, the determining of the credentials for the security data zone being based on determining, by the access manager module, whether the first access token included in the received query belongs to an application registered at the access manager module and whether a user specified in the received query is allowed to use the registered application;
   generating, by the access manager module of the cloud platform, a second access token based on the determined credentials, the second access token being a security data zone access token;
   transmitting the second access token to the querying application, which uses a returned second access token to obtain access to data stored in the security data zone to be processed by the querying application; and
   performing, by the querying application of the cloud platform, a read access, a write access, or the read access and the write access to the data stored in the security data zone of the cloud platform for the user specified in the received query using the returned second access token,
   wherein the generated second access token is a unique zone access token that is valid for a predefined time period, such that the unique zone access token is invalid after the predefined time period has elapsed.

2. The method of claim 1, wherein the application is registered at the access manager module of the cloud platform for assignment of at least one first access token, comprising a manager access login name, a manager access password, or the manager access login name and the manager access password.

3. The method of claim 1, further comprising notifying the access manager module of the cloud platform by a service provider module of a service provider of the respective application about a relationship between the service provider and the user that allows the respective user to use the registered application of the service provider.

4. The method of claim 1, wherein the query is transmitted by an application to the access manager module when the application is initiated on a user device of a user.

5. The method of claim 1, wherein the credentials for the security data zone of the user comprise a user name, a password, or the user name and the password.

6. The method of claim 1, wherein the second access token is generated by an identity and access management unit of the cloud platform.

7. The method of claim 1, further comprising performing, by the querying application the read access and the write access to the data stored in the security data zone of the respective user using the returned second access token.

8. The method of claim 1, further comprising evaluating, manipulating, or evaluating and manipulating data of the user, the evaluating, the manipulating, or the evaluating and the manipulating of the data of the user comprising processing, by the application, the data stored in the security data zone of the user accessed by the application.

9. The method of claim 1, wherein the security data zone of the user comprises a logically separated data storage area in a data storage resource connected with the cloud platform or forming part of the cloud platform.

10. The method of claim 1, wherein the credentials for the security data zone of the user undergo an automatic rotation.

11. A system comprising:
a processor configured to provide access by an application to data stored in a security data zone of a cloud platform; and
a program memory storing a program code that, when executed by the processor, configures the processor to:
receive a query from a querying application of the cloud platform, the query including a first access token;
determine, by an access manager module of the cloud platform, in response to the query received from the querying application of the cloud platform, credentials for a security data zone based on the first access token, the determination of the credentials for the security data zone being based on determination, by the access manager module, of whether the first access token included in the received query belongs to an application registered at the access manager module and whether a user specified in the received query is allowed to use the registered application;
generate, by the access manager module of the cloud platform, a second access token based on the determined credentials, the second access token being a security data zone access token;
transmit the second access token to the querying application, which uses a returned second access token to obtain access to data stored in the security data zone to be processed by the querying application; and
perform, by the querying application of the cloud platform, a read access, a write access, or the read access and the write access to the data stored in the security data zone of the cloud platform for the user specified in the received query using the returned second access token,
wherein the generated second access token is a unique zone access token that is valid for a predefined time period, such that the unique zone access token is invalid after the predefined time period has elapsed.

12. A system for providing access by an application to data stored in a security data zone of a cloud platform, the system comprising:
an access manager module configured to:
receive a query from a querying application of the cloud platform, the query including a first access token;
determine, in response to the query received from the querying application, credentials for a security data zone of a user based on the first access token when the access manager module determines that the first access token included in the received query belongs to a registered application registered at the access manager module, and that the user specified in the received query is allowed to use the registered application;
generate a second access token based on the retrieved credentials, the second access token being a security data zone access token;
transmit the second access token to the querying application that uses the returned second access token to obtain access to data stored in the security data zone of the respective user to be processed by the querying application; and
perform, by the querying application of the cloud platform, a read access, a write access, or the read access and the write access to the data stored in the security data zone of the cloud platform for the user specified in the received query using the returned second access token,
wherein the generated second access token is a unique zone access token that is valid for a predefined time period, such that the unique zone access token is invalid after the predefined time period has elapsed.

13. The system of claim 12, wherein the application is registered by a service provider module at the access manager module of the cloud platform for assignment of at least one first access token, the at least one first access token comprising a manager access login name, a manager access password, or the manager access login name and the manager access password, and
wherein the access manager module of the cloud platform is notified by the service provider module of a service provider of the respective application about an existing relationship between the service provider and the user, which allows the respective user to use the registered application of the service provider.

14. The system of claim 12, wherein the security data zone stores data of the user accessed by the application using the returned second access token that is processed by the application executed on a processor of a user device, such that data of the user is evaluated, manipulated, or evaluated and manipulated.

15. The system of claim 12, wherein the security data zone comprises a logical separated data storage area in a data storage resource connected with the cloud platform or forming part of the cloud platform of the system.

16. The method of claim 8, wherein the data of the user is Internet of Things data of the user.

17. The system of claim 14, wherein the data of the user is Internet of Things data of the user.

* * * * *